(12) United States Patent
Baek

(10) Patent No.: US 9,950,868 B1
(45) Date of Patent: Apr. 24, 2018

(54) DRIVE SYSTEMS FOR EXTENDIBLE CONVEYORS

(71) Applicant: Anders Stougaard Baek, AarhusC (DK)

(72) Inventor: Anders Stougaard Baek, AarhusC (DK)

(73) Assignee: CALJAN RITE-HITE APS., Hasselager (DK)

( * ) Notice: Subject to any disclaimer, the term of this patent is extended or adjusted under 35 U.S.C. 154(b) by 0 days.

(21) Appl. No.: 15/299,181

(22) Filed: Oct. 20, 2016

(51) Int. Cl.
*B65G 15/26* (2006.01)
*B65G 23/22* (2006.01)
*B65G 21/14* (2006.01)
*B65G 21/10* (2006.01)

(52) U.S. Cl.
CPC .............. *B65G 23/22* (2013.01); *B65G 21/10* (2013.01); *B65G 21/14* (2013.01); *B65G 15/26* (2013.01)

(58) Field of Classification Search
CPC ................................. B65G 15/26; B65G 21/14
USPC ........................................ 198/588, 594, 812
See application file for complete search history.

(56) References Cited

U.S. PATENT DOCUMENTS

| | | |
|---|---|---|
| 2,721,645 A | 10/1955 | Eberle |
| 3,835,980 A | 9/1974 | Brooks, Jr. |
| 4,474,287 A | 10/1984 | Thompson |
| 4,643,299 A | 2/1987 | Calundan |
| 5,046,603 A * | 9/1991 | Odenthal ............... B65G 21/14 198/588 |
| 5,190,352 A | 3/1993 | LeBegue et al. |
| 5,351,809 A | 10/1994 | Gilmore et al. |
| 5,423,413 A | 6/1995 | Gilmore |
| 5,487,462 A | 1/1996 | Gilmore |
| 5,796,052 A | 8/1998 | Cristmann |
| 6,006,893 A | 12/1999 | Gilmore et al. |
| 6,431,346 B1 | 8/2002 | Gilmore et al. |
| 6,481,563 B1 | 11/2002 | Gilmore |
| 6,533,096 B2 | 3/2003 | Gilmore et al. |
| 6,935,487 B2 | 8/2005 | Schaum et al. |
| 7,108,125 B2 | 9/2006 | Gilmore et al. |
| 7,168,555 B2 | 1/2007 | Peterson |
| 7,448,486 B1 | 11/2008 | Frankl et al. |
| 7,909,153 B2 | 3/2011 | Pogue |

(Continued)

FOREIGN PATENT DOCUMENTS

| | | | |
|---|---|---|---|
| DE | 3340322 | * 5/1985 | ............. B65G 15/26 |
| EP | 1559666 | 8/2005 | |

*Primary Examiner* — James R Bidwell
(74) *Attorney, Agent, or Firm* — Hanley, Flight & Zimmerman, LLC

(57) ABSTRACT

Drive systems for extendible conveyors are disclosed. An example conveyor includes a major conveyor section mountable to the support surface, an intermediate conveyor section, and a distal conveyor section. A motor is located on the distal conveyor section. A linear actuator is to couple the distal frame to the intermediate frame. The linear actuator to be driven by the motor to move the distal frame in translation relative to the intermediate frame. In response to the motor moving the distal frame in translation relative to the intermediate frame, the intermediate conveyor section and the distal conveyor section are to move at least sometimes simultaneously in the forward direction as the conveyor moves from the fully retracted position to the fully extended position.

21 Claims, 6 Drawing Sheets

(56) References Cited

U.S. PATENT DOCUMENTS

| | | | |
|---|---|---|---|
| 8,496,104 B2* | 7/2013 | Yang | B65G 21/14 198/588 |
| 8,622,199 B2 | 1/2014 | Windfeld et al. | |
| 8,662,291 B2 | 3/2014 | Henderson | |
| 9,004,264 B2* | 4/2015 | Baek, IV | B65G 67/08 198/588 |
| 9,045,289 B2 | 6/2015 | Carpenter | |
| 9,315,328 B2 | 4/2016 | Baek, IV | |
| 9,604,787 B1 | 3/2017 | Baek | |
| 2003/0029694 A1 | 2/2003 | Gilmore | |
| 2004/0112719 A1 | 6/2004 | Gilmore et al. | |
| 2008/0035453 A1* | 2/2008 | Haustein | B65G 13/12 198/595 |
| 2013/0233676 A1 | 9/2013 | Baek, IV et al. | |

* cited by examiner

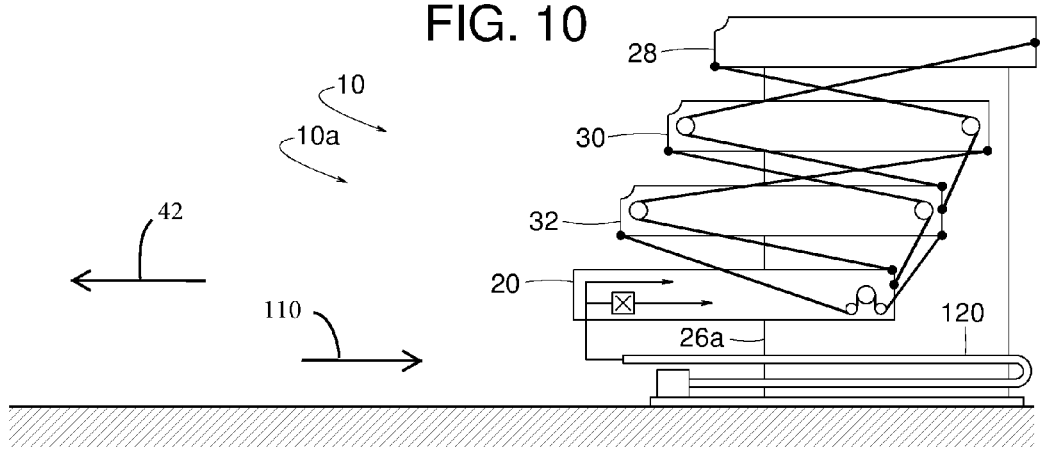
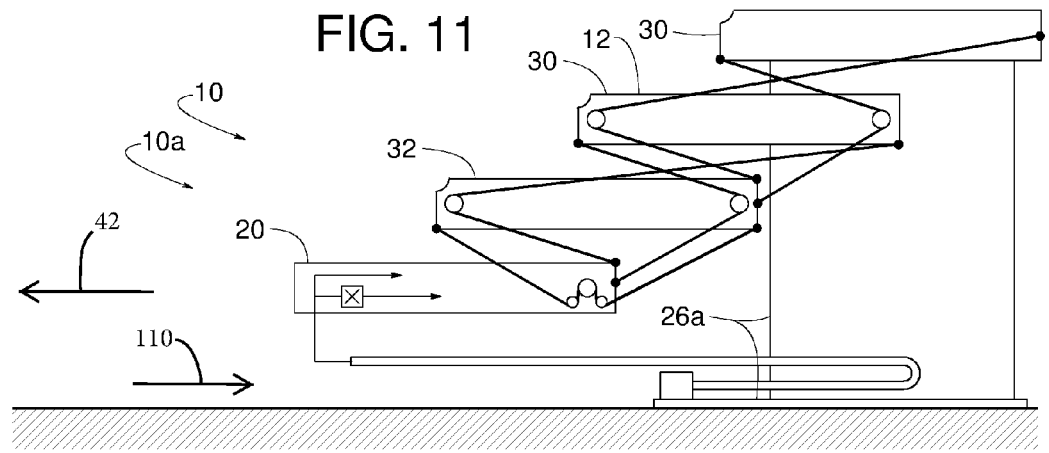
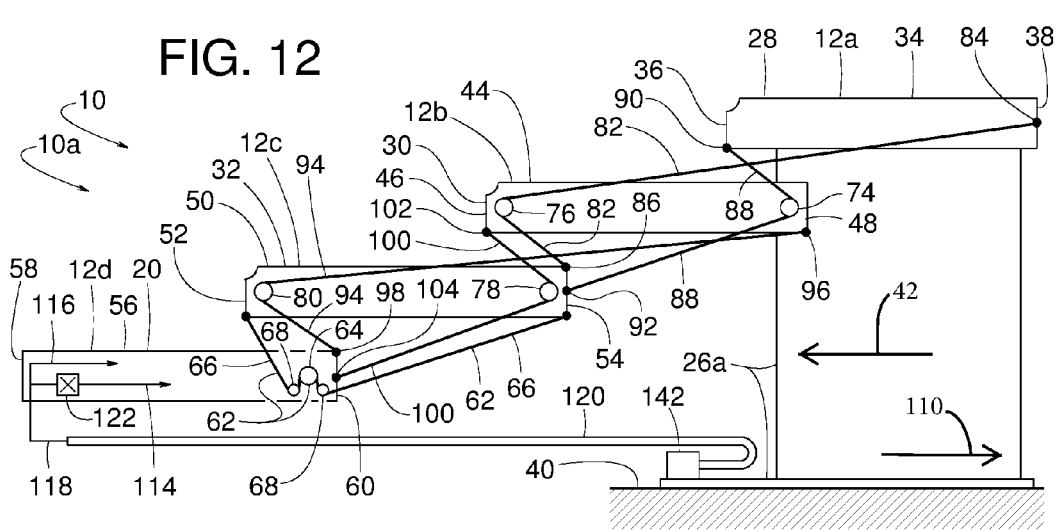

US 9,950,868 B1

DRIVE SYSTEMS FOR EXTENDIBLE CONVEYORS

FIELD OF THE DISCLOSURE

This patent generally pertains to conveyors and, more specifically, to drive systems for extendible conveyors.

BACKGROUND

Conveyors are mechanical devices that include a plurality of rollers (e.g., cylindrical or spherical rollers) for moving boxes, luggage, parcels and other items over the length of an upper conveying surface of the conveyor. The upper conveying surface can be horizontal, or at a fixed or adjustable incline (e.g., positive or negative slope relative to horizontal). Some conveyors have a series of telescopically connected sections that make the upper conveying surface extendible in length.

Some conveyors have powered rollers to propel the items across the upper surface. Some conveyors have passive free-spinning rollers that convey the items by gravity. In some cases, a moving belt overlays the rollers to support the conveyed items with a smoother, more evenly distributed surface. In some instances, the moving belt helps prevent conveyed items from getting caught in transitional areas between adjacent conveyor sections or between rollers within a section.

BRIEF DESCRIPTION OF THE DRAWINGS

FIG. 10 is a schematic diagram of the example conveyor shown in FIG. 5.

FIG. 11 is a schematic diagram of the example conveyor shown in FIG. 7.

FIG. 12 is a schematic diagram of the example conveyor shown in FIG. 9.

DETAILED DESCRIPTION

Figure 1:
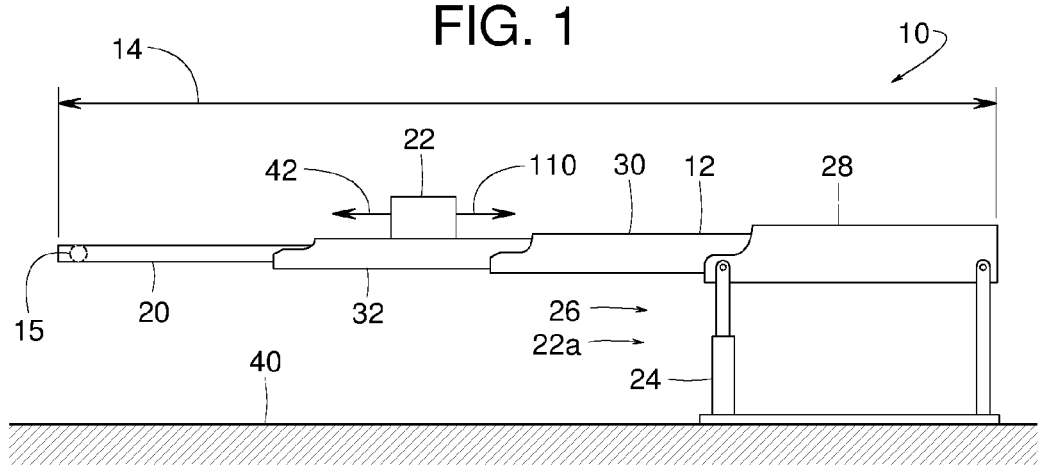
FIG. 1 is a side view of an example conveyor constructed in accordance with the teachings disclosed herein, where the example conveyor is shown in a fully extended position and in a non-inclined orientation relative to horizontal.

Example conveyors disclosed herein may include a powered drive to extend a length (e.g., a longitudinal length) of the conveyors. Some examples conveyors disclosed herein permit the use of an extension drive motor installed or located at a distal conveyor section of the conveyors. In some examples, example conveyors disclosed herein may include a high-voltage circuit and a low-voltage circuit. In some examples, the low-voltage circuit may be contained or located within the distal conveyor section. In some examples, example conveyors disclosed herein employ a high-voltage main power cable that extends along a length (e.g., an entire length) of a conveyor (e.g., a plurality of conveyor sections) to power the drive motor and to energize a step-down transformer that supplies the low-voltage circuit. In some examples, examples conveyors disclosed herein may include the transformer on the distal conveyor section of the conveyors.

FIGS. 1-20 show example conveyors 10 (e.g., conveyors 10a and 10b) disclosed herein. The conveyors 10 of the illustrated examples have an upper conveying surface 12 with an extendible length 14 (e.g., an overall length). For example, the length 14 of the upper conveying surface 12 of the illustrated example is adjusted telescopically. In some examples, the upper conveying surface 12 can be adjusted at an incline 16 relative to horizontal and/or may extend in a non-inclined position (e.g., parallel) relative to horizontal. To reduce costs of the conveyor assembly 10 and/or to reduce (e.g., minimize) the size weight and/or required output torque of a motor 18 (FIGS. 19 and 20) powering the extension and/or retraction of the conveyor 10, the motor 18 of the illustrated example is attached or coupled to a distal conveyor section 20 of the conveyor 10. In some examples, the motor 18 is supported by and/or coupled to the distal conveyor section 20. In this manner, for example, the motor 18 is effectively coupled to an extension and/or retraction mechanism (e.g., a transmission or drive) that adjusts the length 14 (e.g., the overall length) of the upper conveying surface 12. In some examples, the extension and/or retraction mechanism driven by the motor 18 in the distal conveyor section 20 provides reduced torque and/or reduced horsepower of the motor 18 by virtue of the conveyor 10 having multiple conveyor sections (e.g., conveyor sections 20, 32 and 30) that extend and/or retract substantially simultaneously and/or at substantially the same speed. The term "substantially" as used herein means identical or almost identical. For example, substantially simultaneously may include a lag time between movement of the multiple conveyors that is negligible. For example, substantially at the same speed means that a difference in speed between the conveyors is negligible (e.g., less than 1%).

The upper conveying surface 12 of the illustrated example is a surface suitable to support items 22 (e.g., packages, parts, articles, commodities, parcels, luggage, cases, boxes, etc.) and convey the items 22 along the length 14 of the conveyor 10. The items 22 can be moved over the upper surface 22 by gravity and/or by powered movement of the conveying surface 12. Examples of the conveying surface 12 include, but are not limited to, a series of free-spinning rollers, a series of powered rollers, a powered belt overlying a series of rollers, a chute, and various combinations thereof. In some examples, a moving belt overlays the rollers to support the conveyed items with a smoother, more evenly distributed surface. The moving belt helps prevent conveyed items from getting caught in transitional areas between adjacent conveyor sections and/or between rollers within a section. In some examples, the belt has an extendible configuration and may be driven by a powered drum roller 15 installed in the distal conveyor section 20. FIG. 1 shows one example location of the powered drum roller 15. In some examples, the powered drum roller 15 is installed in another section of the conveyor 10.

Figure 2:
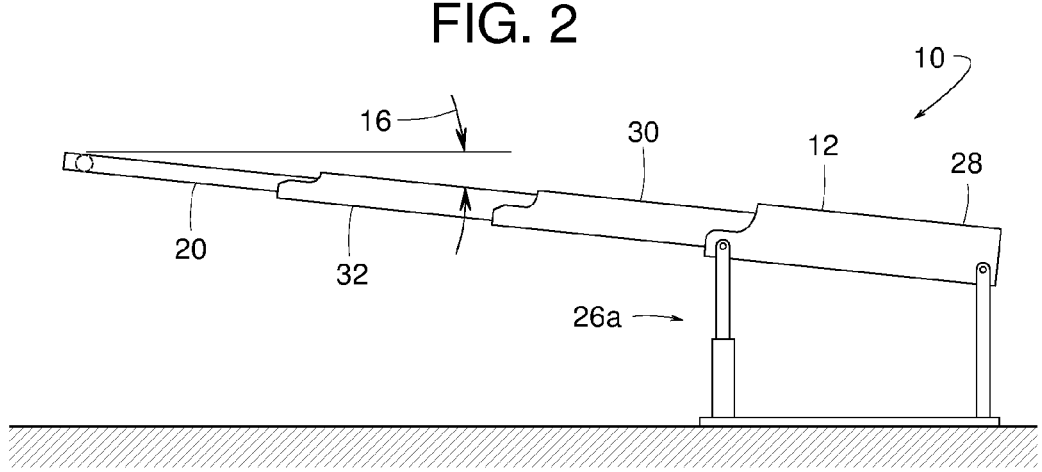
FIG. 2 is a side view of the example conveyor shown in FIG. 1, but showing the example conveyor in an inclined orientation relative to horizontal.
Figure 3:
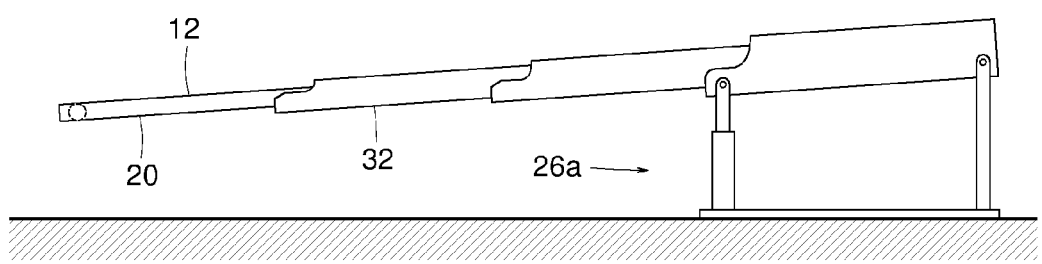
FIG. 3 is a side view of the conveyor shown in FIG. 1, but showing the example conveyor in a declined orientation relative to horizontal.
Figure 16:
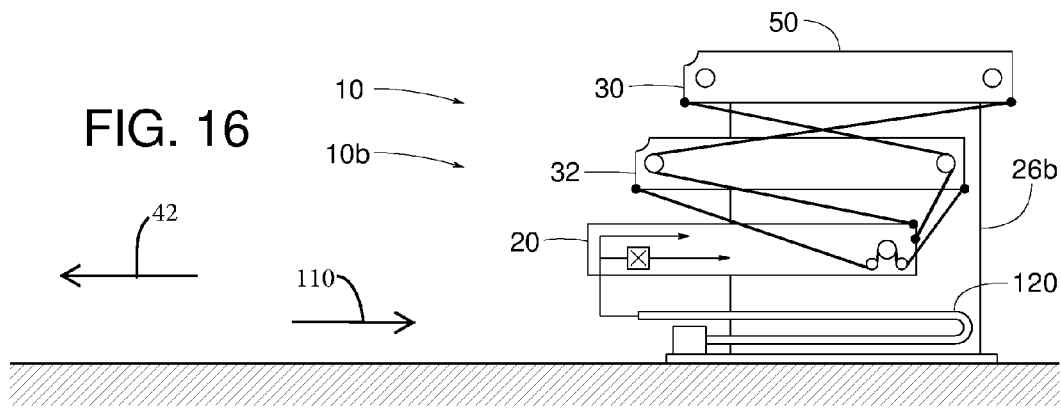
FIG. 16 is a schematic diagram similar to FIG. 10, but showing another example conveyor disclosed herein.
Figure 17:
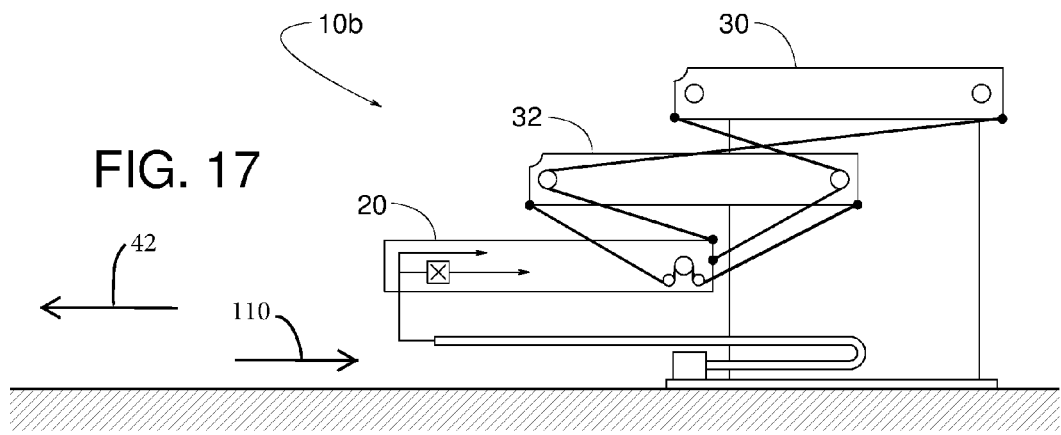
FIG. 17 is a schematic diagram similar to FIG. 16, but showing the example conveyor in a partially extended position.
Figure 18:
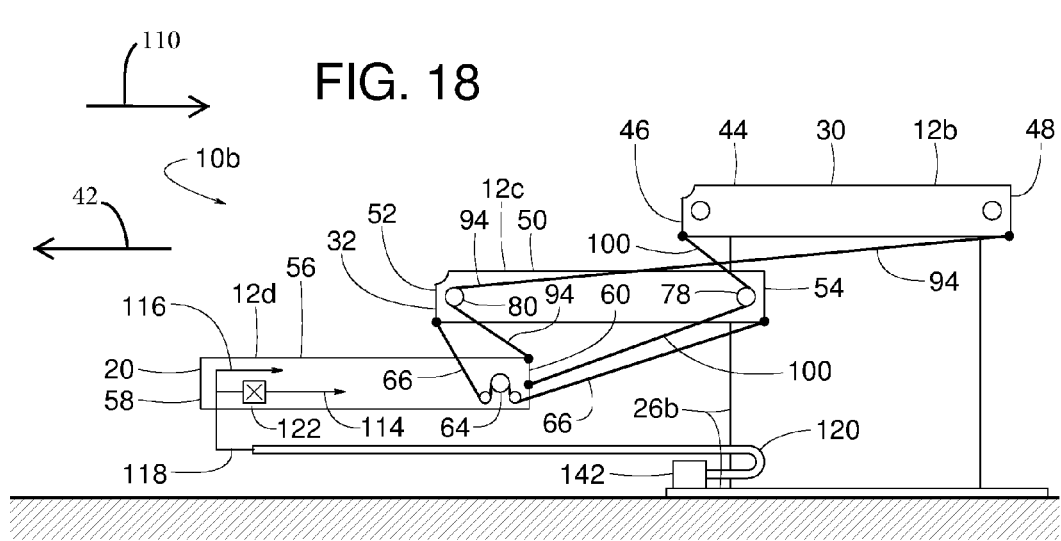
FIG. 18 is a schematic diagram similar to FIG. 16, but showing the example conveyor in a fully extended position.

In the illustrated example of FIGS. 1-3, the conveyor 10 includes an actuator 24 to adjust the incline 16 (e.g., an angle) of the upper conveying surface 12 (e.g., relative to horizontal). Actuator 24 is schematically illustrated to represent means for adjusting the conveyor's angle of inclination 16. Examples of the actuator 24 include, but are not limited to, a linear motor, a hydraulic cylinder, a pneumatic cylinder, a manually operated jack, a rack-and-pinion mechanism and/or any other actuator. In the illustrated example, the actuator 24 is part of a conveyor framework 26 (e.g., a base conveyor framework 26a and/or a major conveyor framework 26b). The base conveyor framework 26a is part of a base conveyor section 28 of a four-section conveyor 10a (FIGS. 1-15), and the major conveyor framework 26b is part of a major conveyor section 30 of a three-section conveyor 10b (FIGS. 16-18). FIG. 1 shows the conveyor 10 in a horizontal position, FIG. 2 shows the conveyor 10 in an inclined (e.g., a tilted-up) position, and FIG. 3 shows the conveyor 10 in a declined (e.g., a tilted-down) position.

Figure 4:
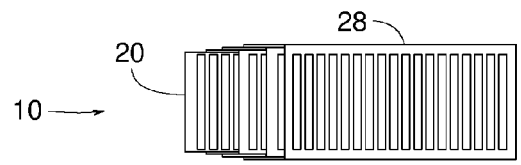
FIG. 4 is a top view of the conveyor shown in FIG. 4, but with the example conveyor in a fully retracted position.
Figure 5:
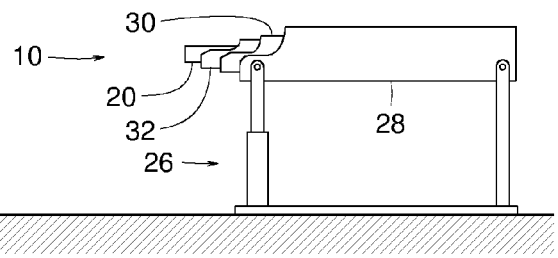
FIG. 5 is a side view of FIG. 4.
Figure 6:
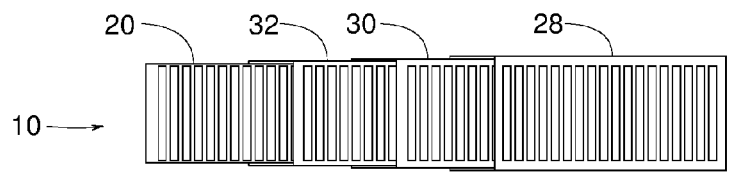
FIG. 6 is a top view similar to FIG. 4, but showing the example conveyor in a partially extended position.
Figure 7:
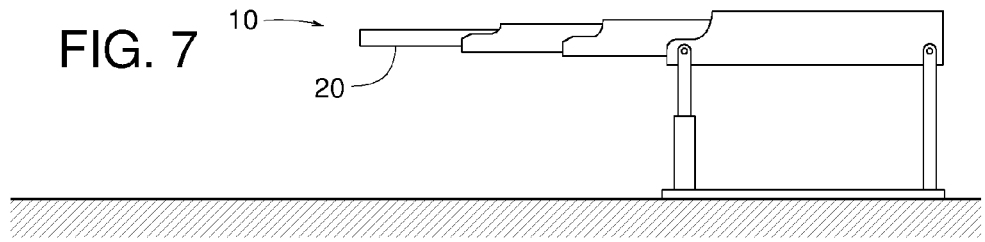
FIG. 7 is a side view of FIG. 6.
Figure 8:
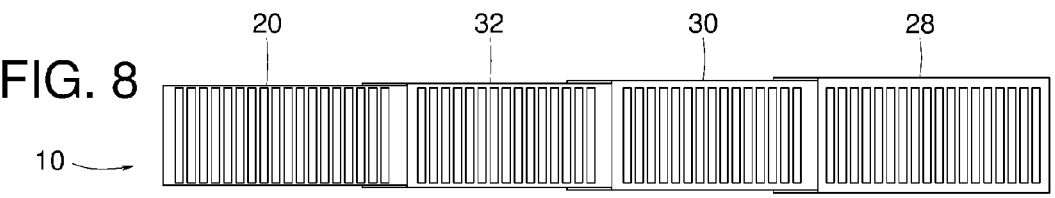
FIG. 8 is a top view similar to FIGS. 4 and 6, but showing the example conveyor in the fully extended position.
Figure 9:
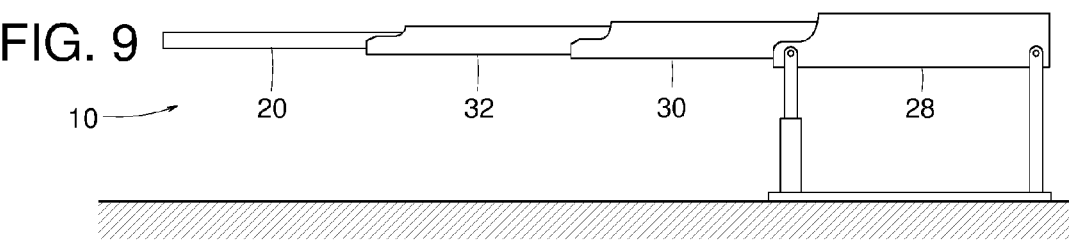
FIG. 9 is a side view of FIG. 8.

FIGS. 1-3 show the conveyor 10 in the fully extended position. FIGS. 4 and 5 respectively show top and side views of the conveyor 10 at a fully retracted position. FIGS. 6 and 7 respectively show top and side views of the conveyor 10 at a partially extended position. And FIGS. 8 and 9 respectively show top and side views of the conveyor 10 at a fully extended position.

To provide the conveyor 10 with adjustable length 14, the conveyor 10 includes the distal conveyor section 20, an intermediate conveyor section 32, and the major conveyor section 30. Conveyor sections 20, 28, 30 and 32 are telescopically interconnected with frames having guide rollers, channels and/or tracks to enable smooth extension and/or retraction of the conveyor sections 20, 28, 30 and 32. In examples where the conveyor 10 is a four-section conveyor, such as the conveyor 10a, the conveyor 10 includes the base conveyor section 28 that telescopically connects to the major conveyor section 30. Base conveyor section 28 supports the major conveyor 30 in a cantilevered manner, which in turn supports the intermediate conveyor section 32 in a cantilevered manner, which in turn supports the distal conveyor section 20 in a cantilevered manner. In some examples, the distal conveyor section 20 may be supported by other structure and/or frame of the conveyor 10.

Base conveyor section 28 of the illustrated example includes a base frame 34, a base front end 36, a base back end 38, and a base conveying surface 12a. Base frame 34 connects to a support surface 40 (e.g., a floor, the ground, or another structure). Base conveyor section 28 is elongate in a forward direction 42 from the base back end 38 to the base front end 36. Base conveying surface 12a of the illustrated example faces generally in an upward direction or orientation.

Major conveyor section 30 of the illustrated example includes a major frame 44, a major front end 46, a major back end 48, and a major conveying surface 12b. Major conveyor section 30 is elongate in the forward direction 42 from the major back end 48 to the major front end 46. Major conveying surface 12b of the illustrated example faces generally in an upward direction or orientation. Major frame 44 is cantilevered from base frame 34 when conveyor 10 is in the fully extended position (FIGS. 1-3, 8, 9, 12 and 15). Major front end 46 is spaced farther from the base front end 36 when conveyor 10 is in the fully extended position than when the conveyor 10 is in the fully retracted position (FIGS. 4, 5, 10 and 13).

Intermediate conveyor section 32 of the illustrated example includes an intermediate frame 50, an intermediate front end 52, an intermediate back end 54, and an intermediate conveying surface 12c. Intermediate conveyor section 32 is elongate in forward direction 42 from the intermediate back end 54 to the intermediate front end 52. Intermediate conveying surface 12c of the illustrated example faces generally in an upward direction or orientation. Intermediate frame 50 is cantilevered from the major frame 30 when the conveyor 10 is in the fully extended position. Intermediate front end 52 is spaced farther from the major front end 46 when the conveyor 10 is in the fully extended position than when the conveyor 10 is in the fully retracted position.

Distal conveyor section 20 of the illustrated example includes a distal frame 56, a distal front end 58, a distal back end 60, and a distal conveying surface 12d. Distal conveyor section 20 is elongate in forward direction 42 from the distal back end 60 to the distal front end 58. Distal conveying surface 12d of the illustrated example faces generally in an upward direction or orientation. Distal frame 56 is cantilevered from the intermediate frame 50 when the conveyor 10 is in the fully extended position. Distal front end 58 is spaced farther from the intermediate front end 52 when the conveyor 10 is in the fully extended position than when the conveyor 10 is in the fully retracted position.

In the example of FIGS. 10-12, the conveyor 10 has a transmission or drive to extend and/or retract the conveyor sections 20, 28, 30, 32 in reaction to movement of a linear actuator 62 that couples (e.g., operatively couples) the distal frame 56 and the intermediate frame 50. In this example, the linear actuator 62 includes a crawler-wheel 64 and a track-line 66. The term. "track-line" refers to any elongate member (e.g., flexible or rigid) that provides a frictional or intermeshing traction surface along which a moving body can travel. Examples of track-line 66 include, but are not limited to, a roller chain, a cogged belt, a smooth belt, a smooth cable, a leadscrew, a smooth rod (e.g., threadless leadscrew), and/or a toothed rack.

The term, "crawler-wheel" as used herein refers to a body that can travel along a track-line in reaction to rotation of the body relative to the track-line. Examples of crawler-wheel 64 include, but are not limited to, a sprocket, a cogged sheave, a smooth sheave, a pulley, a pinion gear, an internally threaded nut engaging a leadscrew, and a skewed roller engaging a smooth rod (i.e., a threadless leadscrew), a gear and/or any other transmission. In some examples the crawler-wheel 64 is an internally threaded nut engaging a track-line in the form of a leadscrew, relative rotation is achieved by either the nut rotating or the leadscrew rotating.

In some examples, the track-line 66 is a roller chain engaging a crawler-wheel 64 in the form of a sprocket. In some such examples, one or more idler sprockets 68 provide a positive engagement between the crawler-wheel sprocket and the track-line chain. In this example, the crawler-wheel 64 is rotated by the motor 18 carried by (e.g., coupled to or supported by) the distal frame 56 (see FIG. 19). In some examples, the motor 18 is a gear motor that has an integral gear-reduction unit 70 for rotating the motor's output shaft 72 at a slower speed than the motor's armature. Gear reduction unit 70 provides the benefit of being able to use a relatively high speed motor, which is normally smaller and more lightweight than a slower motor of equal horsepower. The weight of the motor is important because the motor 18 is on the distal conveyor section 20, which is supported in a cantilevered manner (e.g., when the conveyor 10 is in the fully extended position).

Depending on the selective rotational direction of the motor 18 and the crawler-wheel 64, the distal conveyor section 20 moves relative to (e.g., toward or away from) the intermediate conveyor section 32. Such relative movement between the conveyor sections 20 and 32 causes the conveyor sections 20, 32, 30 to move substantially simultaneously (e.g., in unison) relative to each other and/or the conveyor section 28. Such simultaneous extension and/or retraction of the conveyor sections 20, 32, 30 is provided by a transmission or drive system (e.g., wheels, lines and/or points of attachment).

The term, "wheel" (e.g., a major front wheel, a major back wheel, an intermediate front wheel, and an intermediate back wheel) refers to a generally round rotatable member over which a line or flexible elongate member can ride. Examples of a wheel include, but are not limited to, a sprocket, a sheave (smooth or cogged), a pulley, etc. The term, "line" (e.g., a major front line, a major back line, an intermediate front line and an intermediate back line) refers to any flexible elongate member such as, for example, a roller chain, a cogged belt, a non-cogged belt, and/or a cable.

FIG. 12 illustrates an example drive system (e.g., wheels, lines and points of attachment) of the example conveyor 10. Referring to FIG. 12, a major back wheel 74 is coupled to the major frame 44 and a major front wheel 76 is coupled to the major frame 44, where the major front wheel 76 is positioned more forward (e.g., positioned closer the distal frame 56) than the major back wheel 74. An intermediate back wheel 78 is coupled to the intermediate frame 50 and an intermediate front wheel 80 is coupled to the intermediate frame 50, where the intermediate front wheel 80 is positioned more forward (e.g., positioned closer to the distal frame 56) than intermediate back wheel 78. A major front line 82 has a first major front point 84 and a second major front point 86, where the major front line 82 is elongate between the major front points 84 and 86, the major front line 82 engages (e.g., curves around) the major front wheel 76, the first major front point 84 is anchored to the base frame 34, and the second major front point 86 is anchored to the intermediate frame 50. A major back line 88 has a first major back point 90 and a second major back point 92, where the major back line 88 is elongate between the back points 90 and 92, the major back line 88 engages (e.g., curves around) the major back wheel 74, the first major back point 90 is anchored to the base frame 34, and the second major back point 92 is anchored to intermediate frame 50. An intermediate front line 94 has a first intermediate front point 96 and a second intermediate front point 98, the intermediate front line 94 is elongate between the intermediate front points 96 and 98, the intermediate front line 94 engages (e.g., curves around) the intermediate front wheel 80, the first intermediate front point 96 is anchored to the major frame 44, and the second intermediate front point 98 is anchored to the distal frame 56. An intermediate back line 100 has a first intermediate back point 102 and a second intermediate back point 104, the intermediate back line 100 is elongate between intermediate back points 102 and 104, the intermediate back line 100 engages (e.g., curves around) the intermediate back wheel 78, the first intermediate back point 102 is anchored to the major frame 44, and the second intermediate back point 104 is anchored to the distal frame 56.

The arrangement of wheels, lines and points of attachment of the illustrated example enable the conveyor sections 20, 32 and 30 to extend and/or retract (e.g., relative to each other and/or the conveyor section 28) generally simultaneously. However, in some examples, due to slack in the lines (e.g., the major front line 82, the major back line 88, the intermediate front line 94, and/or the intermediate back line 100), backlash and/or other characteristics of the drive system, a momentary delay may occur as to when the conveyor sections begin moving. The motor 18 rotates the crawler-wheel 64 in a first direction 106 to move the crawler-wheel 64 and the distal conveyor section 20 in the forward direction 42. In reaction to this movement, tension in the lines 100 and 88 respectively cause (e.g., pull) the conveyor sections 32 and 30 to move in the forward direction 42 away from the base conveyor section 28. Conversely, the motor 18 rotates the crawler-wheel 64 in a second direction 108 (e.g., opposite the first direction 106) to move the crawler-wheel 64 and the distal conveyor section 20 in a rearward direction 110 (e.g., toward the base conveyor section 28). In reaction to this movement, the tension in the lines 94 and 82 respectively cause (e.g., pull) the conveyor sections 32 and 30 to move in rearward direction 110 toward base conveyor section 28.

Figure 13:
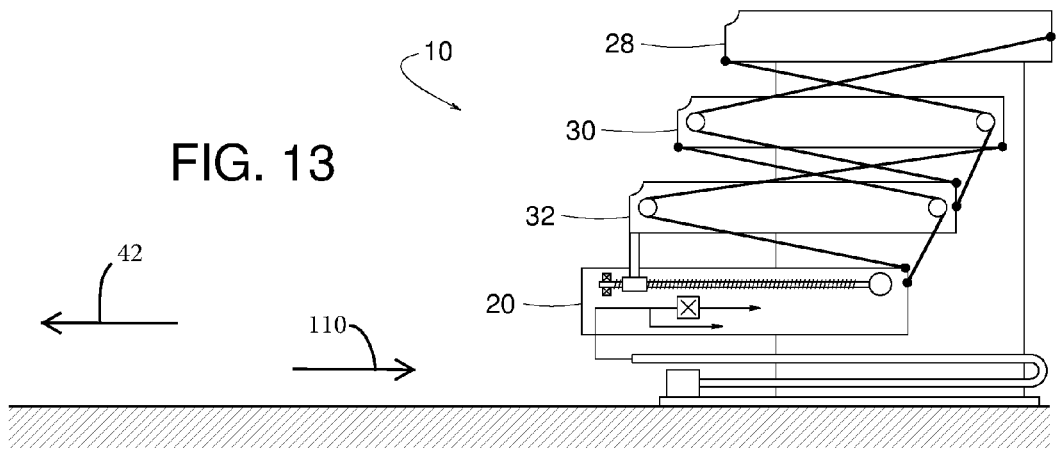
FIG. 13 is an alternate schematic diagram of the example conveyor shown in FIG. 5.
Figure 14:
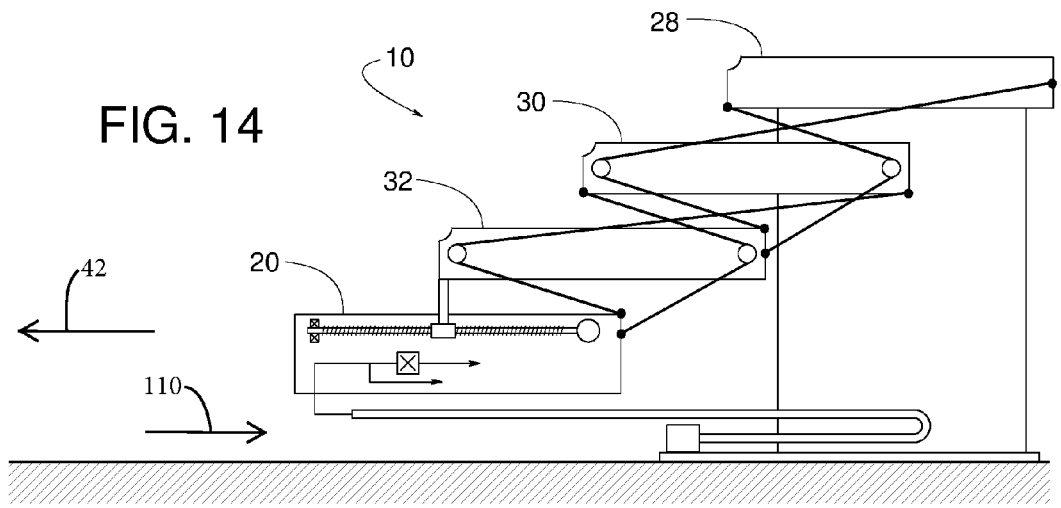
FIG. 14 is an alternate schematic diagram of the example conveyor shown in FIG. 7.
Figure 15:
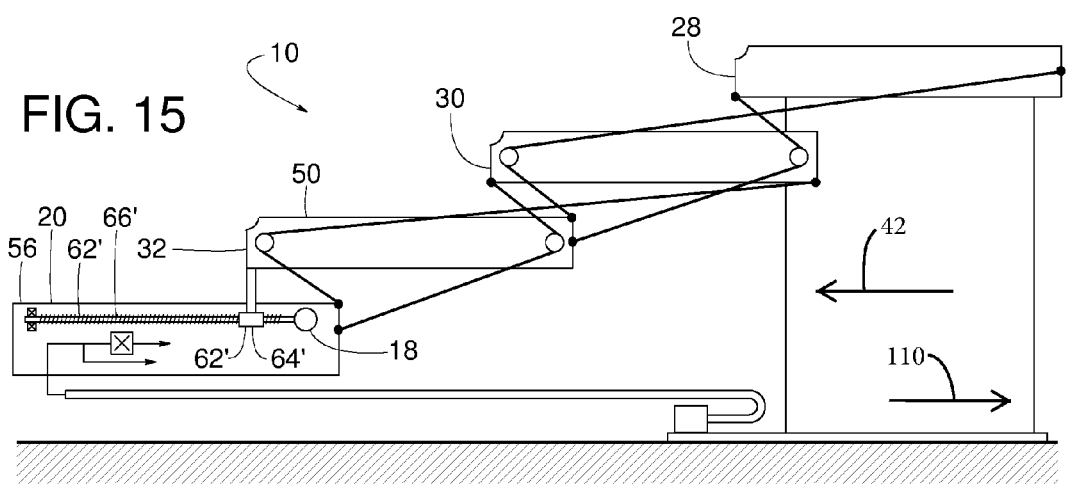
FIG. 15 is an alternate schematic diagram of the example conveyor shown in FIG. 9.

FIGS. 13-15 show an example conveyor similar in structure and function as the conveyor shown in FIGS. 10-12. However, the example conveyor shown in FIGS. 13-15 includes an example linear actuator 62'. In this example, the linear actuator 62' includes a crawler-wheel having an internally threaded nut 64' and a track-line having a leadscrew 66'. Opposite ends of the leadscrew 66' are supported by bearings that are attached to the distal frame 56. The nut 64' is coupled to the intermediate frame 50 such that the nut 64' and the intermediate frame 50 translate (e.g., together, in unison and/or as a unit) in the forward direction 42 and/or the rearward direction 110. The motor 18 turns or rotates the leadscrew 66', as shown, or alternatively, the motor 18 turns nut 64' achieves the same function as the linear actuator 62 of FIGS. 10-12.

FIGS. 16-18 shows the example conveyor 10b, which is similar to the example conveyors shown in FIGS. 1-15. However, the conveyor 10b does not include the base conveyor section 28, the base frame 34 and the base conveyor framework 40, the major front line 82, and the major back line 88 to provide a three-section conveyor. The major conveyor section 30 of the example conveyor 10b includes the major conveyor framework 26b that connects the major frame 44 to support surface 40.

With the three-section conveyor 10b, the motor 18 rotates the crawler-wheel 64 in first direction 106 to move the crawler-wheel 64 and the distal conveyor section 20 in forward direction 42. In reaction to this movement, tension in the intermediate back line 100 causes (e.g., pulls) the intermediate conveyor section 32 to move in the forward direction 42 away from the major conveyor section 30. Conversely, the motor 18 rotates the crawler-wheel 64 in second direction 108 to move the crawler-wheel 64 and the distal conveyor section 20 in rearward direction 110. In reaction to this movement, tension in the intermediate front line 94 causes (e.g., pulls) the intermediate conveyor section 32 in the rearward direction 110 toward the major conveyor section 30.

Figure 19:
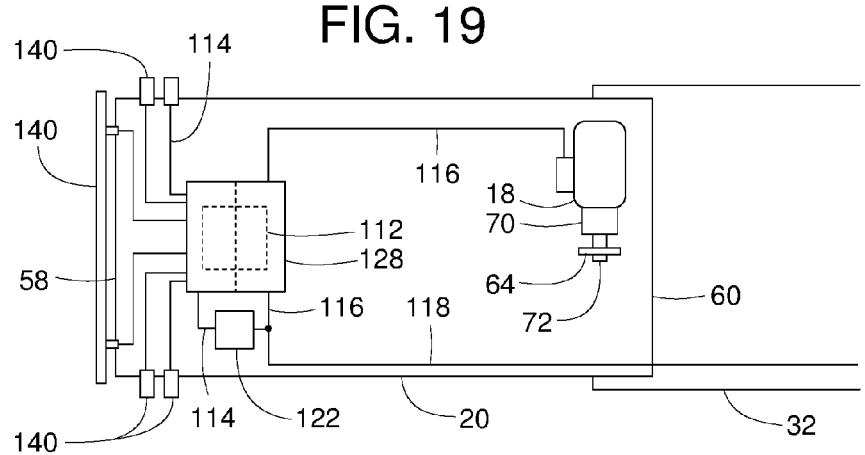
FIG. 19 is a schematic top view of an example distal conveyor that may implement the example conveyors shown in FIGS. 1-18.
Figure 20:
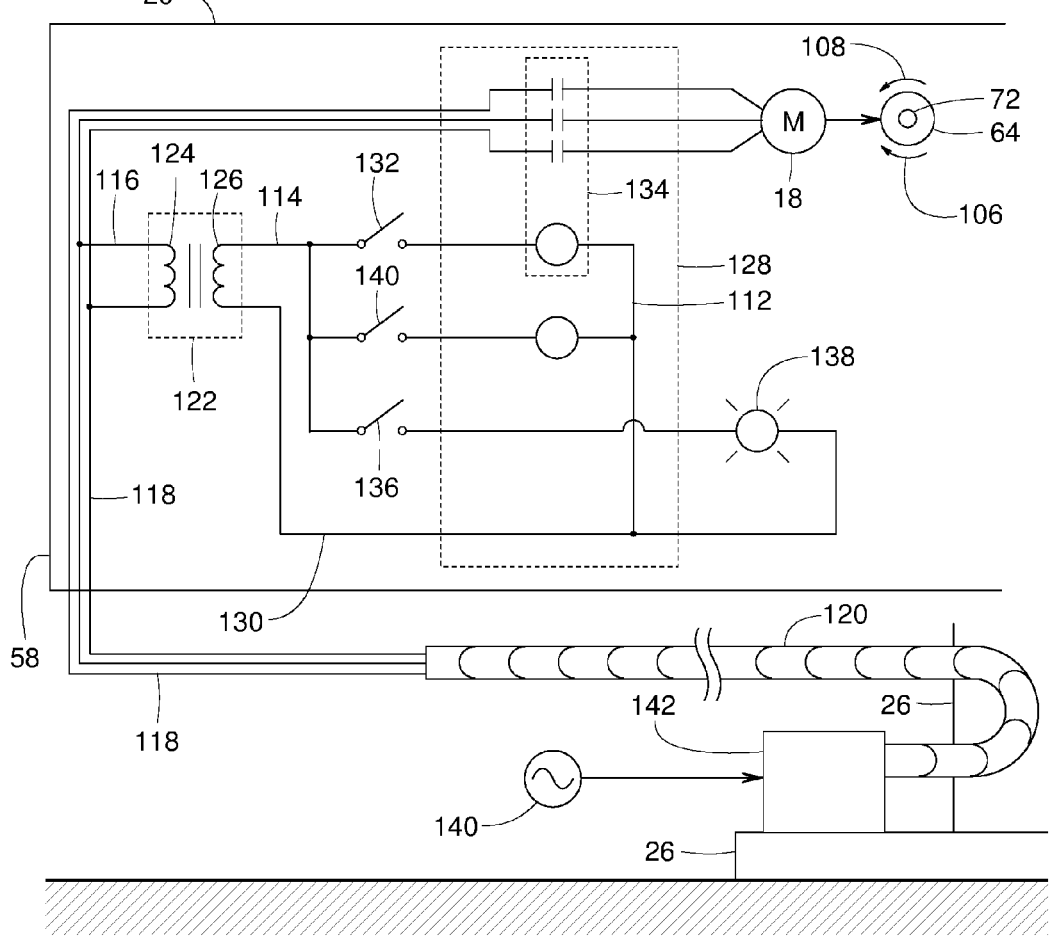
FIG. 20 is an example wiring schematic that may be used to implement the example conveyors shown in FIGS. 1-19.

The extension and/or retraction drive of the conveyors 10a and 10b may be implemented by an example electrical circuit 112 shown in FIGS. 19 and 20. Some examples of the circuit 112 includes a low-voltage circuit 114 and a high-voltage circuit 116. In the illustrated example, the low-voltage circuit 114 (e.g., the entire low-voltage circuit 114) is located on the distal conveyor section 20. In some examples, locating the low-voltage circuit 114 on the distal conveyor section 20 provides some valuable benefits. With this arrangement, the low-voltage wiring of the low-voltage circuit 114 can be done separately (e.g., and early on) during the conveyor manufacturing process. For example, the low-voltage wiring can be completed without having to have the distal conveyor section 20 attached to the other conveyor sections (e.g., conveyor sections 30, 32 and/or 28).

Moreover, a high-voltage circuit 116 can reduce the weight load on the conveyor 10. With the high-voltage circuit 116, a high-voltage main power cable 118 can be positioned (e.g., to run) along the length of conveyor 10 to a high-voltage motor (e.g., the motor 18) located on the distal conveyor section 20. A high-voltage power cable is lighter than a low-voltage power cable because the low-voltage power cable needs to conduct more current for a given power draw (e.g., kilowatts, horsepower, etc.). The weight of the main power cable 118 is important because a lighter cable provides less of a weight load on a conveyor (e.g., the distal conveyor 20) that is supported in a cantilevered arrangement (e.g., when the conveyor sections 20, 32, 30 and 28 are in the fully extended positions). Additionally or alternatively, a lighter cable enables smaller radius turns within a flexible cable carrier 120 (sometimes known as a drag chain or cat track). A flexible cable carrier with a tighter radius turn is more compact and, thus, easier to incorporate into a slender conveyor. In some examples, the cable carrier 120 is a Kolibri 30.030.3 Radius 100 mm by Wireco of Paimio, Finland.

In the illustrated example, the high-voltage circuit 116 and the low-voltage circuit 114 separate at a step-down transformer 122 on the distal conveyor section 20. Main power cable 118 of the high-voltage circuit 116 connects to the transformer's primary windings 124, and the low-voltage circuit 114 connects to the transformer's secondary windings 126. Low-voltage circuit 114 feeds into a control box 128 of a controller 130 that controls the operation of the conveyor 10. The controller 130 is schematically illustrated to represent any circuit to control at least some of the conveyor's operation (e.g., extension/retraction of conveyor 10, the operation of powered drum roller 15, an emergency stop, end stop limit switches, conveyor tilt, motor direction of linear actuator 62, etc.). Examples of the controller 130 include, but are not limited to, an ICB (integrated circuit board), a PLC (programmable logic controller), a computer, relays, switches, motor contactors, a logic circuit, and/or combinations thereof.

In some examples, the controller 130 includes a first electrical switch 132 to control a motor contactor 134 for energizing the motor 18, a second electrical switch 136 to energize a headlight 138 on the distal conveyor section 20, and one or more additional switches 140 (operated manually or otherwise) to control other conveyor functions (e.g., an emergency stop, end stop limit switches, conveyor tilt, motor direction of linear actuator 62, etc.). It should be noted that the discrete electrical components shown with reference to the controller 130 illustratively represent not only discrete components but also represent other functional equivalents, such as integrated circuits.

As for the high-voltage circuit 116, the main high-voltage electrical power 140 enters a junction box 142 and connects to the main power cable 118. In the example shown in FIGS. 13-15, the junction box 142 is mounted to the base conveyor section 28, which includes the base frame 34 and the base framework 26a. In the example shown in FIGS. 16-18, the junction box 142 is mounted to the major conveyor section 30, which includes the major frame 44 and major framework 26b. From the junction box 142, the main power cable 118 feeds through the flexible cable carrier 120, which directs the main power cable 118 along a portion of the length (e.g., a certain length) of the conveyor 10 toward the distal conveyor section 20. Main power cable 118 exits the cable carrier 120 and connects to the transformer's primary windings 124 to inductively energize the secondary windings 126 and the low-voltage circuit 114. Main power cable 118 also connects to the motor contactor 134, which delivers high-voltage power to the motor 18, which in turn drives the crawler-wheel 64.

In some examples, the crawler-wheel 64 and the motor 18 are proximate the distal conveyor's distal back end 60. This places the motor's weight at an advantageously less cantilevered position on a fully extended conveyor. This also places the crawler-wheel 64 at an advantageously leveraged position with respect to track-line 66 and the adjacent intermediate conveyor section 32.

It should be noted that the terms, "high-voltage" and "low-voltage," when used in the same context or with reference to each other, means that one is at a greater electrical potential than the other. When associated with alternating current, the voltage is in terms of an RMS value (root-mean-squared value) rather than the value of a voltage wave form at a particular instant in time. In some examples, "high-voltage" refers to an electrical potential greater than 300 volts, and "low-voltage" refers to electrical potential less than 300 volts. In some more specific examples, "high-voltage" refers to a nominal 400 volts (e.g., 3 phase, 50 hz (hertz)), and "low-voltage" refers to a nominal 230 volts (e.g., single phase, 50 hz). In some examples, "high-voltage" refers to a nominal 480 volts (e.g., 3 phase, 60 hz), and "low-voltage" refers to a nominal 120 volts (e.g., single phase, 60 hz).

At least some of the aforementioned examples include one or more features and/or benefits including, but not limited to, the following:

In some examples, a conveyor mountable to a support surface and having selectively a fully extended position and a fully retracted position. In some such examples, the conveyor includes a major conveyor section mountable to the support surface. In some such examples, the major conveyor section includes a major frame, a major front end, a major back end, and a major conveying surface. In some such examples, the major conveyor section is elongate in a forward direction from the major back end to the major front end. In some such examples, the major conveying surface faces in an upward orientation. In some such examples, an intermediate conveyor section includes an intermediate frame, an intermediate front end, an intermediate back end, and an intermediate conveying surface. In some such examples, the intermediate conveyor section is elongate in the forward direction from the intermediate back end to the intermediate front end. In some such examples, the intermediate conveying surface faces in an upward orientation. In some such examples, the intermediate frame is cantilevered from the major frame when the conveyor is in a fully extended position. In some such examples, the intermediate front end is spaced farther from the major front end when the conveyor is in the fully extended position than when the conveyor is in a fully retracted position. In some such examples, a distal conveyor section includes a distal frame, a distal front end, a distal back end, and a distal conveying surface. In some such examples, the distal conveyor section is elongate in the forward direction from the distal back end to the distal front end. In some such examples, the distal conveying surface facing in an upward orientation, the distal frame is cantilevered from the intermediate frame when the conveyor is in the fully extended position. In some such examples, the distal front end being spaced farther from the intermediate front end when the conveyor is in the fully extended position than when the conveyor is in the fully retracted position. In some such examples, a motor is located on the distal conveyor section. In some such examples, a linear actuator is to couple the distal frame to the intermediate frame. In some such examples, the linear actuator is driven by the motor to move the distal frame in translation relative to the intermediate frame. In some such examples, in response to the motor moving the distal frame in translation relative to the intermediate frame, the intermediate conveyor section and the distal conveyor section move at least sometimes simultaneously in the forward direction as the conveyor moves from the fully retracted position to the fully extended position.

In some examples, a transformer located on the distal conveyor section, an electrical switch located on the distal conveyor section. In some such examples, a high-voltage circuit being wired to the transformer and to the motor, the high-voltage circuit having a main power cable that extends from the major conveyor section to the distal conveyor section In some such examples, a low-voltage circuit located on the distal conveyor section and being wired to the transformer and to the electrical switch, the high-voltage circuit and the main power cable having a higher-voltage than that of the low-voltage circuit.

In some examples, a crawler-wheel is coupled to and rotated by the motor selectively in a first direction and a second direction. In some such examples, the crawler-wheel being at a substantially fixed location relative to the distal frame. In some such examples, a track-line having a first track point and a second track point. In some such examples, the track-line is elongate between the first track point and the second track point. In some such examples, the track-line to engage the crawler-wheel, the first track point being anchored to the intermediate frame. In some such examples, the second track point being anchored to the intermediate frame, the first track point being proximate the intermediate back end of the intermediate conveyor section, the second track point being proximate the intermediate front end of the intermediate conveyor section. In some such examples, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction.

In some examples, the crawler-wheel is a sprocket and the track-line is a roller chain.

In some examples, an intermediate back wheel is coupled to the intermediate frame. In some such examples, an intermediate front wheel coupled to the intermediate frame.

In some such examples, the intermediate front wheel being positioned more forward than the intermediate back wheel. In some such examples, an intermediate front line has a first intermediate front point and a second intermediate front point. In some such examples, the intermediate front line being elongate between the first intermediate front point and the second intermediate front point. In some such examples, the intermediate front line to curve around the intermediate front wheel, the first intermediate front point to anchor to the major frame. In some such examples, the second intermediate front point to anchor to the distal frame. In some such examples, an intermediate back line has a first intermediate back point and a second intermediate back point. In some such examples, the intermediate back line being elongate between the first intermediate back point and the second intermediate back point. In some such examples, the intermediate back line to curve around the intermediate back wheel, the first intermediate back point to anchor to the major frame. In some such examples, the second intermediate back point to anchor to the distal frame.

In some such examples, a conveyor is mountable to a support surface and having selectively a fully extended position and a fully retracted position, the conveyor includes a base conveyor section including a base frame, a base front end, a base back end, and a base conveying surface, the base frame being mountable to the support surface, the base conveyor section being elongate in a forward direction from the base back end to the base front end; a major conveyor section including a major frame, a major front end, a major back end, and a major conveying surface, the major conveyor section being elongate in the forward direction from the major back end to the major front end, the major frame being cantilevered from the base frame when the conveyor is in the fully extended position, the major front end being spaced farther from the base front end when the conveyor is in the fully extended position than when the conveyor is in the fully retracted position; an intermediate conveyor section including an intermediate frame, an intermediate front end, an intermediate back end, and an intermediate conveying surface, the intermediate conveyor section being elongate in the forward direction from the intermediate back end to the intermediate front end, the intermediate frame being cantilevered from the major frame when the conveyor is in the fully extended position, the intermediate front end being spaced farther from the major front end when the conveyor is in the fully extended position than when the conveyor is in the fully retracted position; a distal conveyor section including a distal frame, a distal front end, a distal back end, and a distal conveying surface; the distal conveyor section being elongate in the forward direction from the distal back end to the distal front end, the distal frame being cantilevered from the intermediate frame when the conveyor is in the fully extended position, the distal front end being spaced farther from the intermediate front end when the conveyor is in the fully extended position than when the conveyor is in the fully retracted position; a motor on the distal conveyor section; a linear actuator to couple the distal frame and the intermediate frame, the linear actuator being driven by the motor to move the distal frame in translation relative to the intermediate frame; a transformer on the distal conveyor section; an electrical switch on the distal conveyor section; a high-voltage circuit being wired to the transformer and to the motor, the high-voltage circuit having a main power cable that extends from the base conveyor section to the distal conveyor section; and a low-voltage circuit on the distal conveyor section and being wired to the transformer and to the electrical switch, the high-voltage circuit and the main power cable being of a higher-voltage than that of the low-voltage circuit.

In some examples, the motor is closer to the distal back end than to the distal front end.

In some examples, the electrical switch is manually operated and determines a predetermined function of the linear actuator.

In some examples, the major conveyor section, the intermediate conveyor section and the distal conveyor section are to move at least sometimes simultaneously in the forward direction as the conveyor moves from the fully retracted position to the fully extended position.

In some examples, a major back wheel on the major frame; a major front wheel on the major frame, the major front wheel being positioned more forward than the major back wheel; an intermediate back wheel on the intermediate frame; an intermediate front wheel on the intermediate frame, the intermediate front wheel being positioned more forward than the intermediate back wheel; a major front line having a first major front point and a second major front point, the major front line being elongate between the first major front point and the second major front point, the major front line engaging the major front wheel, the first major front point being anchored to the base frame, the second major front point being anchored to the intermediate frame; a major back line having a first major back point and a second major back point, the major back line being elongate between the first major back point and the second major back point, the major back line engaging the major back wheel, the first major back point being anchored to the base frame, the second major back point being anchored to the intermediate frame; an intermediate front line having a first intermediate front point and a second intermediate front point, the intermediate front line being elongate between the first intermediate front point and the second intermediate front point, the intermediate front line engaging the intermediate front wheel, the first intermediate front point being anchored to the major frame, the second intermediate front point being anchored to the distal frame; and an intermediate back line having a first intermediate back point and a second intermediate back point, the intermediate back line being elongate between the first intermediate back point and the second intermediate back point, the intermediate back line engaging the intermediate back wheel, the first intermediate back point being anchored to the major frame, the second intermediate back point being anchored to the distal frame.

In some examples, the linear actuator includes a crawler-wheel coupled to and rotated by the motor selectively in a first direction and a second direction, the crawler-wheel being at a substantially fixed location relative to the distal frame; and a track-line having a first track point and a second track point, the track-line being elongate between the first track point and the second track point, the track-line to engage the crawler-wheel, the first track point being anchored to the intermediate frame, the second track point being anchored to the intermediate frame, the first track point being proximate the intermediate back end of the intermediate conveyor section, the second track point being proximate the intermediate front end of the intermediate conveyor section, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction.

In some examples, the crawler-wheel is a sprocket and the track-line is a roller chain.

In some examples, the track-line is a cogged belt segment.

In some such examples, a conveyor is mountable to a support surface and having selectively a fully extended position and a fully retracted position, the conveyor includes a base conveyor section including a base frame, a base front end, a base back end, and a base conveying surface, the base frame being mountable to the support surface, the base conveyor section being elongate in a forward direction from the base back end to the base front end; a major conveyor section including a major frame, a major front end, a major back end, and a major conveying surface, the major conveyor section being elongate in the forward direction from the major back end to the major front end, the major frame being cantilevered from the base frame when the conveyor is in the fully extended position, the major front end being spaced farther from the base front end when the conveyor is in the fully extended position than when the conveyor is in the fully retracted position; an intermediate conveyor section including an intermediate frame, an intermediate front end, an intermediate back end, and an intermediate conveying surface, the intermediate conveyor section being elongate in the forward direction from the intermediate back end to the intermediate front end, the intermediate frame being cantilevered from the major frame when the conveyor is in the fully extended position, the intermediate front end being spaced farther from the major front end when the conveyor is in the fully extended position than when the conveyor is in the fully retracted position; a distal conveyor section including a distal frame, a distal front end, a distal back end, and a distal conveying surface, the distal conveyor section being elongate in the forward direction from the distal back end to the distal front end, the distal frame being cantilevered from the intermediate frame when the conveyor is in the fully extended position, the distal front end being spaced farther from the intermediate front end when the conveyor is in the fully extended position than when the conveyor is in the fully retracted position; a major back wheel coupled to the major frame; a major front wheel coupled to the major frame, the major front wheel being positioned more forward than the major back wheel; an intermediate back wheel coupled to the intermediate frame; an intermediate front wheel coupled to the intermediate frame, the intermediate front wheel being positioned more forward than the intermediate back wheel; a major front line having a first major front point and a second major front point, the major front line being elongate between the first major front point and the second major front point, the major front line curving around the major front wheel, the first major front point being anchored to the base frame, the second major front point being anchored to the intermediate frame; a major back line having a first major back point and a second major back point, the major back line being elongate between the first major back point and the second major back point, the major back line curving around the major back wheel, the first major back point being anchored to the base frame, the second major back point being anchored to the intermediate frame; an intermediate front line having a first intermediate front point and a second intermediate front point, the intermediate front line being elongate between the first intermediate front point and the second intermediate front point, the intermediate front line curving around the intermediate front wheel, the first intermediate front point being anchored to the major frame, the second intermediate front point being anchored to the distal frame; an intermediate back line having a first intermediate back point and a second intermediate back point, the intermediate back line being elongate between the first intermediate back point and the second intermediate back point, the intermediate back line curving around the intermediate back wheel, the first intermediate back point being anchored to the major frame, the second intermediate back point being anchored to the distal frame; a motor supported by the distal conveyor section; a crawler-wheel coupled to and rotated by the motor selectively in a first direction and a second direction, the crawler-wheel being at a substantially fixed location relative to the distal frame; a track-line having a first track point and a second track point, the track-line being elongate between the first track point and the second track point, the track-line engaging the crawler-wheel, the first track point being anchored to the intermediate frame, the second track point being anchored to the intermediate frame, the first track point being proximate the intermediate back end of the intermediate conveyor section, the second track point being proximate the intermediate front end of the intermediate conveyor section, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction; a transformer located on the distal conveyor section; an electrical switch located on the distal conveyor section; a high-voltage circuit being wired to the transformer and to the motor, the high-voltage circuit having a main power cable that extends from the base conveyor section to the distal conveyor section; and a low-voltage circuit located on the distal conveyor section and being wired to the transformer and to the electrical switch, the high-voltage circuit and the main power cable being of a higher-voltage than that of the low-voltage circuit.

In some examples, the motor is closer to the distal back end than to the distal front end.

In some such examples, the major conveyor section, the intermediate conveyor section and the distal conveyor section are to move at least sometimes simultaneously in the forward direction as the conveyor moves from the fully retracted position to the fully extended position.

In some examples, the electrical switch is manually operated and determines a predetermined function of the motor.

In some examples, the crawler-wheel is a sprocket and the track-line is a roller chain.

In some examples, the crawler-wheel is an internally threaded nut and the track-line is a leadscrew.

In some examples, the track-line is a cogged belt segment.

In some examples, the conveyor has selectively a tilted-up position, a tilted-down position, and a horizontal position.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A conveyor being mountable to a support surface and having selectively a fully extended position and a fully retracted position, the conveyor comprising:

a major conveyor section mountable to the support surface, the major conveyor section including a major frame, a major front end, a major back end, and a major conveying surface, the major conveyor section being elongate in a forward direction from the major back end to the major front end, the major conveying surface facing in an upward orientation;

an intermediate conveyor section including an intermediate frame, an intermediate front end, an intermediate back end, and an intermediate conveying surface, the intermediate conveyor section being elongate in the forward direction from the intermediate back end to the intermediate front end, the intermediate conveying surface facing in an upward orientation, the intermediate frame being cantilevered from the major frame when the conveyor is in a fully extended position, the intermediate front end being spaced farther from the major front end when the conveyor is in the fully extended position than when the conveyor is in a fully retracted position;

a distal conveyor section including a distal frame, a distal front end, a distal back end, and a distal conveying surface, the distal conveyor section being elongate in the forward direction from the distal back end to the distal front end, the distal conveying surface facing in an upward orientation, the distal frame being cantilevered from the intermediate frame when the conveyor is in the fully extended position, the distal front end being spaced farther from the intermediate front end when the conveyor is in the fully extended position than when the conveyor is in the fully retracted position;

a motor, a transformer and an electrical switch located on the distal conveyor section;

a linear actuator to couple the distal frame to the intermediate frame, the linear actuator to be driven by the motor to move the distal frame in translation relative to the intermediate frame; and in response to the motor moving the distal frame in translation relative to the intermediate frame, the intermediate conveyor section and the distal conveyor section to move at least sometimes simultaneously in the forward direction as the conveyor moves from the fully retracted position to the fully extended position.

2. The conveyor of claim 1, further comprising:

a high-voltage circuit being wired to the transformer and to the motor, the high-voltage circuit having a main power cable that extends from the major conveyor section to the distal conveyor section; and a low-voltage circuit located on the distal conveyor section and being wired to the transformer and to the electrical switch, the high-voltage circuit and the main power cable having a higher-voltage than that of the low-voltage circuit.

3. The conveyor of claim 1, wherein the linear actuator comprises:

a crawler-wheel coupled to and rotated by the motor selectively in a first direction and a second direction, the crawler-wheel being at a substantially fixed location relative to the distal frame; and a track-line having a first track point and a second track point, the track-line being elongate between the first track point and the second track point, the track-line to engage the crawler-wheel, the first track point being anchored to the intermediate frame, the second track point being anchored to the intermediate frame, the first track point being proximate the intermediate back end of the intermediate conveyor section, the second track point being proximate the intermediate front end of the intermediate conveyor section, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction.

4. The conveyor of claim 3, wherein the crawler-wheel is a sprocket and the track-line is a roller chain.

5. A conveyor being mountable to a support surface and having selectively a fully extended position and a fully retracted position, the conveyor comprising:
- a major conveyor section mountable to the support surface, the major conveyor section including a major frame, a major front end, a major back end, and a major conveying surface, the major conveyor section being elongate in a forward direction from the major back end to the major front end, the major conveying surface facing in an upward orientation;
- an intermediate conveyor section including an intermediate frame, an intermediate front end, an intermediate back end, and an intermediate conveying surface, the intermediate conveyor section being elongate in the forward direction from the intermediate back end to the intermediate front end, the intermediate conveying surface facing in an upward orientation, the intermediate frame being cantilevered from the major frame when the conveyor is in a fully extended position, the intermediate front end being spaced farther from the major front end when the conveyor is in the fully extended position than when the conveyor is in a fully retracted position;
- a distal conveyor section including a distal frame, a distal front end, a distal back end, and a distal conveying surface, the distal conveyor section being elongate in the forward direction from the distal back end to the distal front end, the distal conveying surface facing in an upward orientation, the distal frame being cantilevered from the intermediate frame when the conveyor is in the fully extended position, the distal front end being spaced farther from the intermediate front end when the conveyor is in the fully extended position than when the conveyor is in the fully retracted position;
- an intermediate back wheel coupled to the intermediate frame;
- an intermediate front wheel coupled to the intermediate frame, the intermediate front wheel being positioned more forward than the intermediate back wheel;
- an intermediate front line having a first intermediate front point and a second intermediate front point, the intermediate front line being elongate between the first intermediate front point and the second intermediate front point, the intermediate front line to curve around the intermediate front wheel, the first intermediate front point to anchor to the major frame, the second intermediate front point to anchor to the distal frame;
- an intermediate back line having a first intermediate back point and a second intermediate back point, the intermediate back line being elongate between the first intermediate back point and the second intermediate back point, the intermediate back line to curve around the intermediate back wheel, the first intermediate back point to anchor to the major frame, the second intermediate back point to anchor to the distal frame;
- a motor located on the distal conveyor section; and
- a linear actuator to couple the distal frame to the intermediate frame, the linear actuator to be driven by the motor to move the distal frame in translation relative to the intermediate frame; and in response to the motor moving the distal frame in translation relative to the intermediate frame, the intermediate conveyor section and the distal conveyor section to move at least sometimes simultaneously in the forward direction as the conveyor moves from the fully retracted position to the fully extended position.

6. A conveyor being mountable to a support surface and having selectively a fully extended position and a fully retracted position, the conveyor comprising:
- a base conveyor section including a base frame, a base front end, a base back end, and a base conveying surface, the base frame being mountable to the support surface, the base conveyor section being elongate in a forward direction from the base back end to the base front end;
- a major conveyor section including a major frame, a major front end, a major back end, and a major conveying surface, the major conveyor section being elongate in the forward direction from the major back end to the major front end, the major frame being cantilevered from the base frame when the conveyor is in the fully extended position, the major front end being spaced farther from the base front end when the conveyor is in the fully extended position than when the conveyor is in the fully retracted position;
- an intermediate conveyor section including an intermediate frame, an intermediate front end, an intermediate back end, and an intermediate conveying surface, the intermediate conveyor section being elongate in the forward direction from the intermediate back end to the intermediate front end, the intermediate frame being cantilevered from the major frame when the conveyor is in the fully extended position, the intermediate front end being spaced farther from the major front end when the conveyor is in the fully extended position than when the conveyor is in the fully retracted position;
- a distal conveyor section including a distal frame, a distal front end, a distal back end, and a distal conveying surface; the distal conveyor section being elongate in the forward direction from the distal back end to the distal front end, the distal frame being cantilevered from the intermediate frame when the conveyor is in the fully extended position, the distal front end being spaced farther from the intermediate front end when the conveyor is in the fully extended position than when the conveyor is in the fully retracted position;
- a motor on the distal conveyor section;
- a linear actuator to couple the distal frame and the intermediate frame, the linear actuator being driven by the motor to move the distal frame in translation relative to the intermediate frame;
- a transformer on the distal conveyor section;
- an electrical switch on the distal conveyor section;
- a high-voltage circuit being wired to the transformer and to the motor, the high-voltage circuit having a main power cable that extends from the base conveyor section to the distal conveyor section; and
- a low-voltage circuit on the distal conveyor section and being wired to the transformer and to the electrical switch, the high-voltage circuit and the main power cable being of a higher-voltage than that of the low-voltage circuit.

7. The conveyor of claim 6, wherein the motor is closer to the distal back end than to the distal front end.

8. The conveyor of claim 6, wherein the electrical switch is manually operated and determines a predetermined function of the linear actuator.

9. The conveyor of claim 6, wherein the major conveyor section, the intermediate conveyor section and the distal conveyor section are to move at least sometimes simultaneously in the forward direction as the conveyor moves from the fully retracted position to the fully extended position.

10. The conveyor of claim 6, further comprising:
a major back wheel on the major frame;
a major front wheel on the major frame, the major front wheel being positioned more forward than the major back wheel;
an intermediate back wheel on the intermediate frame;
an intermediate front wheel on the intermediate frame, the intermediate front wheel being positioned more forward than the intermediate back wheel;
a major front line having a first major front point and a second major front point, the major front line being elongate between the first major front point and the second major front point, the major front line engaging the major front wheel, the first major front point being anchored to the base frame, the second major front point being anchored to the intermediate frame;
a major back line having a first major back point and a second major back point, the major back line being elongate between the first major back point and the second major back point, the major back line engaging the major back wheel, the first major back point being anchored to the base frame, the second major back point being anchored to the intermediate frame;
an intermediate front line having a first intermediate front point and a second intermediate front point, the intermediate front line being elongate between the first intermediate front point and the second intermediate front point, the intermediate front line engaging the intermediate front wheel, the first intermediate front point being anchored to the major frame, the second intermediate front point being anchored to the distal frame; and
an intermediate back line having a first intermediate back point and a second intermediate back point, the intermediate back line being elongate between the first intermediate back point and the second intermediate back point, the intermediate back line engaging the intermediate back wheel, the first intermediate back point being anchored to the major frame, the second intermediate back point being anchored to the distal frame.

11. The conveyor of claim 6, wherein the linear actuator comprises:
a crawler-wheel coupled to and rotated by the motor selectively in a first direction and a second direction, the crawler-wheel being at a substantially fixed location relative to the distal frame; and
a track-line having a first track point and a second track point, the track-line being elongate between the first track point and the second track point, the track-line to engage the crawler-wheel, the first track point being anchored to the intermediate frame, the second track point being anchored to the intermediate frame, the first track point being proximate the intermediate back end of the intermediate conveyor section, the second track point being proximate the intermediate front end of the intermediate conveyor section, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction.

12. The conveyor of claim 11, wherein the crawler-wheel is a sprocket and the track-line is a roller chain.

13. The conveyor of claim 11, wherein the track-line is a cogged belt segment.

14. A conveyor being mountable to a support surface and having selectively a fully extended position and a fully retracted position, the conveyor comprising:
a base conveyor section including a base frame, a base front end, a base back end, and a base conveying surface, the base frame being mountable to the support surface, the base conveyor section being elongate in a forward direction from the base back end to the base front end;
a major conveyor section including a major frame, a major front end, a major back end, and a major conveying surface, the major conveyor section being elongate in the forward direction from the major back end to the major front end, the major frame being cantilevered from the base frame when the conveyor is in the fully extended position, the major front end being spaced farther from the base front end when the conveyor is in the fully extended position than when the conveyor is in the fully retracted position;
an intermediate conveyor section including an intermediate frame, an intermediate front end, an intermediate back end, and an intermediate conveying surface, the intermediate conveyor section being elongate in the forward direction from the intermediate back end to the intermediate front end, the intermediate frame being cantilevered from the major frame when the conveyor is in the fully extended position, the intermediate front end being spaced farther from the major front end when the conveyor is in the fully extended position than when the conveyor is in the fully retracted position;
a distal conveyor section including a distal frame, a distal front end, a distal back end, and a distal conveying surface, the distal conveyor section being elongate in the forward direction from the distal back end to the distal front end, the distal frame being cantilevered from the intermediate frame when the conveyor is in the fully extended position, the distal front end being spaced farther from the intermediate front end when the conveyor is in the fully extended position than when the conveyor is in the fully retracted position;
a major back wheel coupled to the major frame;
a major front wheel coupled to the major frame, the major front wheel being positioned more forward than the major back wheel;
an intermediate back wheel coupled to the intermediate frame;
an intermediate front wheel coupled to the intermediate frame, the intermediate front wheel being positioned more forward than the intermediate back wheel;
a major front line having a first major front point and a second major front point, the major front line being elongate between the first major front point and the second major front point, the major front line curving around the major front wheel, the first major front point being anchored to the base frame, the second major front point being anchored to the intermediate frame;

a major back line having a first major back point and a second major back point, the major back line being elongate between the first major back point and the second major back point, the major back line curving around the major back wheel, the first major back point being anchored to the base frame, the second major back point being anchored to the intermediate frame;

an intermediate front line having a first intermediate front point and a second intermediate front point, the intermediate front line being elongate between the first intermediate front point and the second intermediate front point, the intermediate front line curving around the intermediate front wheel, the first intermediate front point being anchored to the major frame, the second intermediate front point being anchored to the distal frame;

an intermediate back line having a first intermediate back point and a second intermediate back point, the intermediate back line being elongate between the first intermediate back point and the second intermediate back point, the intermediate back line curving around the intermediate back wheel, the first intermediate back point being anchored to the major frame, the second intermediate back point being anchored to the distal frame;

a motor supported by the distal conveyor section;

a crawler-wheel coupled to and rotated by the motor selectively in a first direction and a second direction, the crawler-wheel being at a substantially fixed location relative to the distal frame;

a track-line having a first track point and a second track point, the track-line being elongate between the first track point and the second track point, the track-line engaging the crawler-wheel, the first track point being anchored to the intermediate frame, the second track point being anchored to the intermediate frame, the first track point being proximate the intermediate back end of the intermediate conveyor section, the second track point being proximate the intermediate front end of the intermediate conveyor section, engagement between the crawler-wheel and the track-line to urge the crawler-wheel and the distal conveyor section in the forward direction when the crawler-wheel rotates in the first direction, engagement between the crawler-wheel and the track-line to urge the crawler-wheel and the distal conveyor section in a rearward direction when the crawler-wheel rotates in the second direction, the rearward direction being opposite of the forward direction;

a transformer located on the distal conveyor section;

an electrical switch located on the distal conveyor section;

a high-voltage circuit being wired to the transformer and to the motor, the high-voltage circuit having a main power cable that extends from the base conveyor section to the distal conveyor section; and a low-voltage circuit located on the distal conveyor section and being wired to the transformer and to the electrical switch, the high-voltage circuit and the main power cable being of a higher-voltage than that of the low-voltage circuit.

15. The conveyor of claim 14, wherein the motor is closer to the distal back end than to the distal front end.

16. The conveyor of claim 14, wherein the major conveyor section, the intermediate conveyor section and the distal conveyor section are to move at least sometimes simultaneously in the forward direction as the conveyor moves from the fully retracted position to the fully extended position.

17. The conveyor of claim 14, wherein the electrical switch is manually operated and determines a predetermined function of the motor.

18. The conveyor of claim 14, wherein the crawler-wheel is a sprocket and the track-line is a roller chain.

19. The conveyor of claim 14, wherein the crawler-wheel is an internally threaded nut and the track-line is a leadscrew.

20. The conveyor of claim 14, wherein the track-line is a cogged belt segment.

21. The conveyor of claim 14, wherein the conveyor has selectively a tilted-up position, a tilted-down position, and a horizontal position.

\* \* \* \* \*